United States Patent [19]

Larson et al.

[11] 3,877,029

[45] Apr. 8, 1975

[54] ELECTRONIC KEYBOARD

[75] Inventors: Willis A. Larson, Wayzata; David E. Colglazier, Minneapolis, both of Minn.

[73] Assignee: Magic Dot, Inc., Minneapolis, Minn.

[22] Filed: Mar. 9, 1973

[21] Appl. No.: 339,524

[52] U.S. Cl. ........ 340/365 R; 340/166 R; 178/17 C; 200/DIG. 1

[51] Int. Cl. .......... G08c 1/00

[58] Field of Search ........ 340/365 R, 365 C, 166 R, 340/166 FE, 324 A, 324 AD; 178/17 R, 178/17 C, 18, 19, 20; 307/116; 317/DIG. 2, 146; 200/DIG. 1

[56] References Cited

UNITED STATES PATENTS

| | | | |
|---|---|---|---|
| 3,112,476 | 11/1963 | Cohler et al. | 200/DIG. 1 |
| 3,177,481 | 4/1965 | Joy et al. | 317/DIG. 2 |
| 3,492,440 | 1/1970 | Cerbone et al. | 340/365 C |
| 3,530,312 | 9/1970 | Adelson et al. | 200/DIG. 1 |
| 3,549,909 | 12/1970 | Adelson et al. | 200/DIG. 1 |
| 3,691,551 | 9/1972 | Looschen | 200/DIG. 1 |
| 3,760,121 | 9/1973 | Nissim | 235/156 |
| 3,766,404 | 10/1973 | Larson et al. | 317/DIG. 2 |

OTHER PUBLICATIONS

Allan Lyntel, Handbook of Transistor Circuits, First Edition, 1967, pp. 88–89.

*Primary Examiner*—John W. Caldwell
*Assistant Examiner*—Richard P. Lange
*Attorney, Agent, or Firm*—Wicks & Nemer

[57] ABSTRACT

An electronic keyboard is disclosed in which the touch of a user, representing data, at immovable touch surfaces is actively encoded by interconnected amplifiers to provide an encoded signal to integrators, for example capacitors, to thus provide signals from the touch surfaces encoded into logical format. In the preferred embodiment, various of the components of the keyboard of the present invention are applied to the opposed major faces of a ceramic substrate and additional amplifying means are interconnected with the integrators to provide the output signal power desired. An oscillator and an antenna arrangement are further provided, in an alternate embodiment, for actuation of the keyboard of the present invention through radiation coupled from the antenna, through the user of the keyboard of the present invention, and to the touch surfaces.

22 Claims, 11 Drawing Figures

ELECTRONIC KEYBOARD

BACKGROUND

This invention relates generally to keyboards, more particularly to electronic keyboards, and still more particularly to solid state, electronic, data entry keyboards.

With the increasing popularity of devices using keyboards for data entry, such as telephones, typewriters, calculators, data entry terminals to computers, and the like, an increasing need has arisen for data entry keyboards which are reliable and which may be easily fabricated. The present invention provides such a keyboard.

Further, the keyboard of the present invention provides for ease of actuation by a user, may be fabricated in small size, may be fabricated by high volume manufacturing techniques, utilizes fewer parts than heretofore thought possible, may be fabricated at low cost, and can provide reliable actuation at a high level of performance.

Still further, the keyboard of the present invention is particularly suited for use with circuitry of the type where passive components are deposited upon a substrate, whether by thick or thin film techniques, and active components are in the form of integrated chips bonded to the depositions, often termed hybrid circuits, and circuitry of the type where components are integrated, and circuitry of like type, for the purposes of this invention defined as microelectronic circuitry.

SUMMARY

A preferred embodiment of the keyboard of the present invention includes a ceramic insulating substrate having a set of isolated, at least partially conductive touch surfaces immovably fixed in a patterned arrangement, for example, a patterned arrangement of ten numerically designated "keys," with the surfaces accessible to the touch or approach of a user to allow a desired input signal to result from a user by selectively touching individual touch surfaces. Connection is made through the substrate between each touch surface and amplifiers in integrated form on the opposite face of the substrate from the touch surfaces. The amplifiers actively encode the indication of a touch of a particular surface, for example into a binary code, and provide an encoded output to a series of signal integrators, for example capacitors, for use.

Also in the preferred embodiment, the output signal from the capacitors is applied to further amplifiers to provide increased power capacity from the keyboard.

In an alternate embodiment, an oscillator may also be connected to an antenna deposited and arranged around each key of the keyboard to provide an oscillation to the keyboard through electronic radiation coupled from the antenna, to the user, and to the touch surfaces to allow sufficient energy to be coupled to provide an actuation of the keyboard.

It is thus the primary object of the present invention to provide a novel keyboard.

It is also a primary object of the present invention to provide a novel solid state, electronic, data entry, active encoding keyboard.

It is a further object of the present invention to provide a novel keyboard which allows battery operation.

It is a further object of the present invention to provide a novel keyboard which allows ease of fabrication.

It is a further object of the present invention to provide a novel keyboard which is inexpensive to fabricate.

It is a further object of the present invention to provide a novel keyboard which may be of small size.

It is a further object of the present invention to provide a novel keyboard which is reliable.

These and further objects and advantages of the present invention will become clearer in the light of the following detailed description of an illustrative embodiment of this invention described in connection with the drawings.

Figure 1:
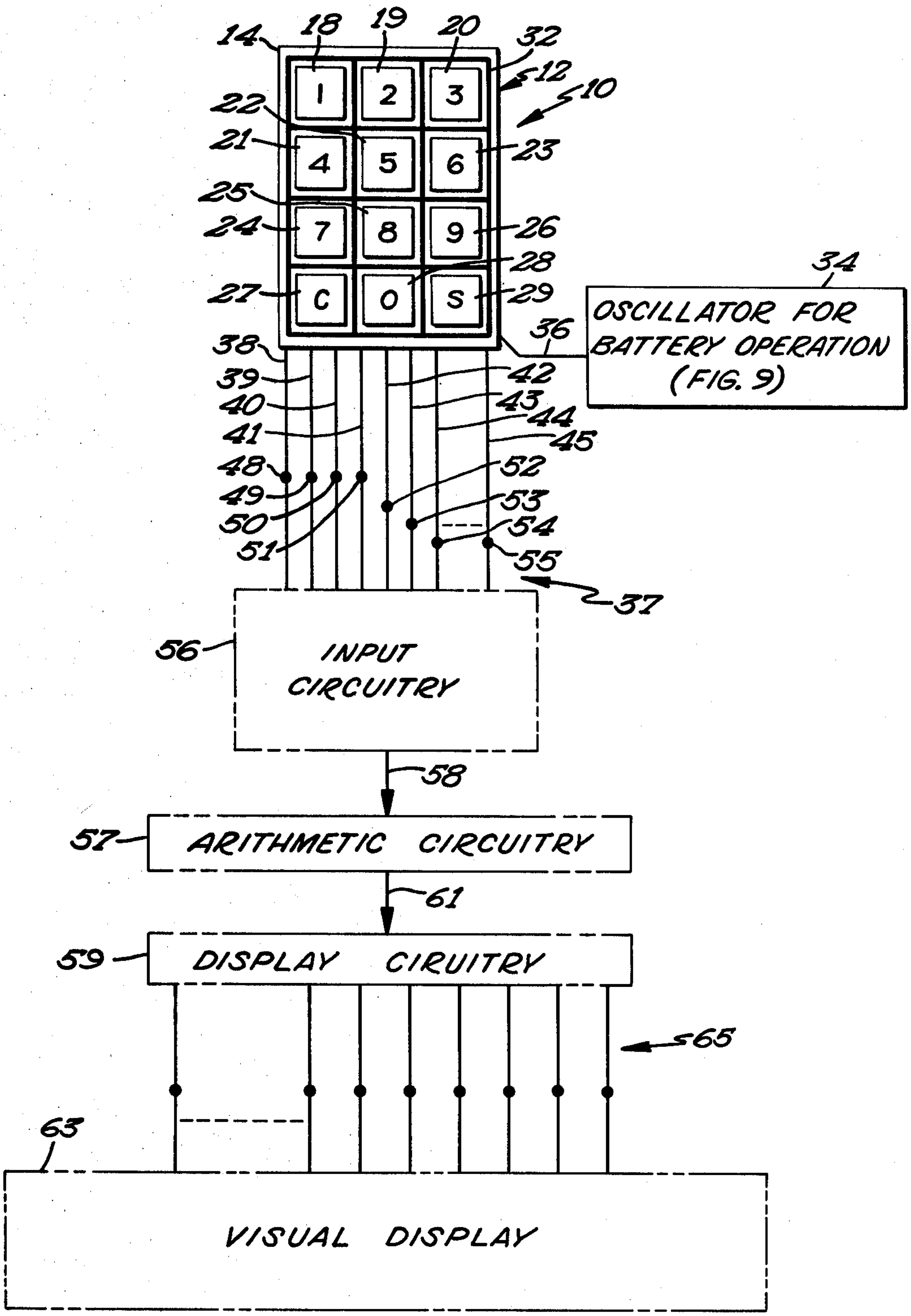
FIG. 1 shows a block diagram of a system utilizing an electronic keyboard according to the present invention and resulting in a visual display.

Where used in the various figures of the drawings, the same numerals designate the same or similar parts. Further, when the terms "right," "left," "front," "back," "vertical," "horizontal," "left edge," "right edge," "top," "bottom," and similar terms are used herein, it should be understood that these terms have reference only to the structure shown in the drawings, generally as it would appear to a person viewing the drawings, and are utilized only to facilitate describing the invention.

DESCRIPTION

Figure 6:
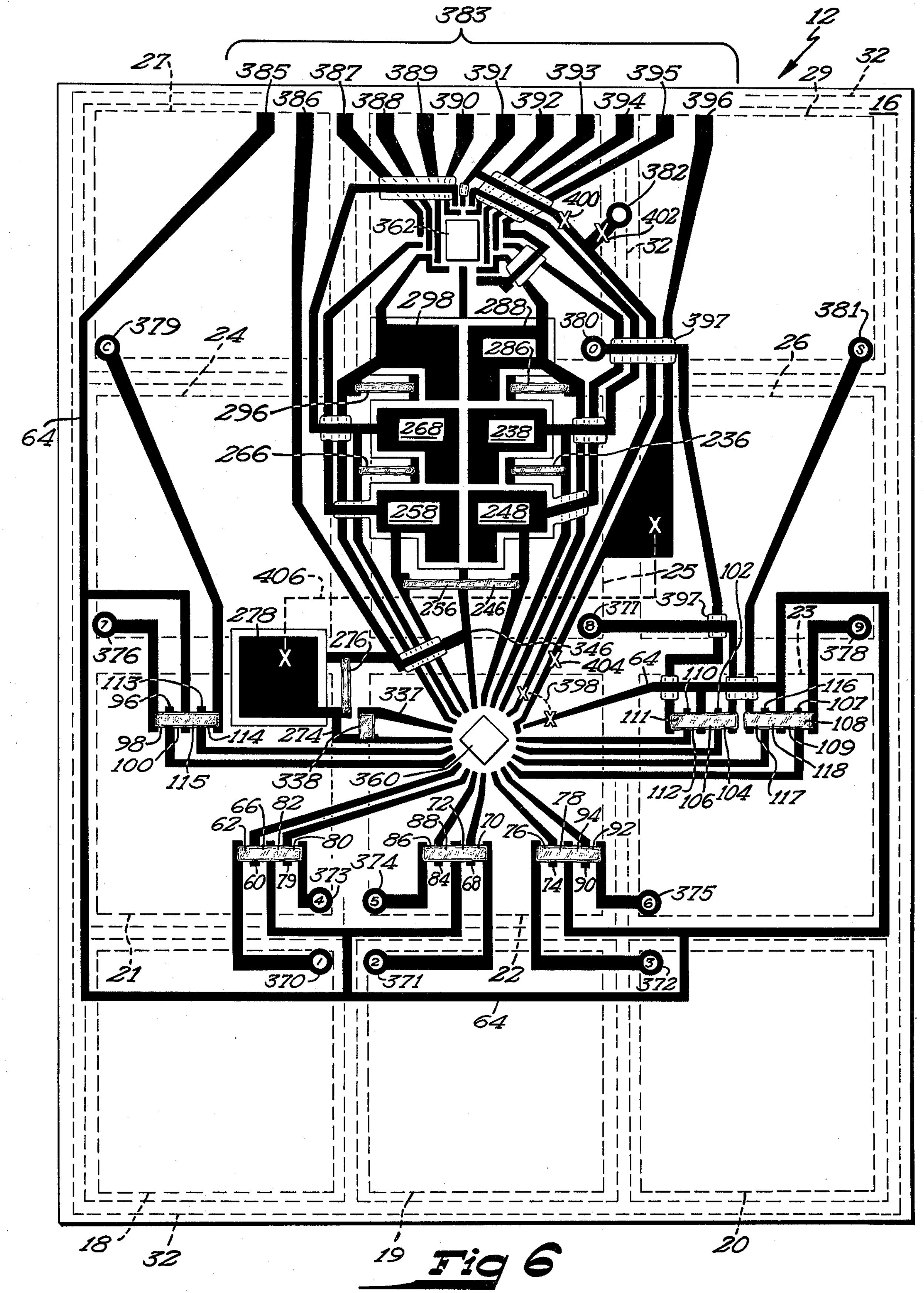
FIG. 6 shows a preferred embodiment of a hybrid arrangement of the various components desirable with the electronic keyboard of the present invention shown on one surface of an insulator with the data entry portion shown in dotted line on the opposite surface of the insulator.

In FIG. 1, a solid state, electronic, data entry keyboard according to the present invention is generally designated 10. Keyboard 10 includes an insulating substrate 12, preferrably of ceramic, of opposed major faces 14 and 16. Face 14 is seen in FIG. 1, and opposing face 16 is seen in FIG. 6.

Immovably attached to face 14 are twelve electrically isolated, individual, square surfaces 18 to 29, inclusively, arranged in a horizontal, laterally repetitive, patterned fashion of three squares across and four squares down with designations 1, 2, 3, 4, 5, 6, 7, 8, 9, C, 0, and S indicated upon the surfaces 18–29, respectively.

The surfaces are applied of conventional conductive material or semiconductive material as described in the copending application for Letters Patent by the same inventors entitled "Apparatus And Material For Protecting Microelectronics From High Potential Electricity" filed Aug. 14, 1972 and accorded Ser. No. 280,258. As indicated, a semiconductive material is disclosed in that application for the purposes of protecting the microelectronic circuit from the application of high potential energy, commonly found to be static electricity.

Around and about each surface 18 to 29 in a grid arrangement is an antenna generally designated 32. Antenna 32 then borders and interconnects with itself around each of the touch surfaces 18 to 29 to completely surround each of the touch surfaces and provide an additional degree of electrical isolation, in one embodiment, by providing a conductive shielding electrode around each touch surface 18 to 29 thus preventing any leakage of electricity between touch surfaces. Antenna 32, as described more fully hereinafter, can alternately function as an antenna radiating sufficient energy, through its coupling with a user, to the touch surfaces to provide an actuation of the keyboard 10.

Oscillator 34, shown in block diagram in FIG. 1, is connected to antenna 32, in the latter embodiment discussed above, by a connection 36 to a point on face 16 of substrate 12 described further hereinafter with respect to FIG. 6 and with respect to FIG. 9.

Keyboard 10 also includes a signal output connection, generally designated 36, connected to surface 16, also further discussed hereinafter. Output connection 37 is shown in FIG. 1 as electrical connections 38 to 45, inclusively, connected to junction points 48 to 55, respectively.

Output connection 37 is shown as connected to an input circuit designated 56 which is electrically connected to arithmetic circuit 57 by a connection 58. Arithmetic circuit 57 in turn is connected to display circuitry 59 by a connection 61 which, in turn, is shown as connected to a visual display 63 by a generally designated connection 65.

The arrangement shown in FIG. 1 demonstrates the application of keyboard 10 of the present invention to a calculator where a user enters data into the calculator via keyboard 10, the data is provided to input circuitry 56, processed in arithmetic circuitry 57, arranged for display in circuitry 59, and displayed to the user in circuitry 63.

Figure 2:
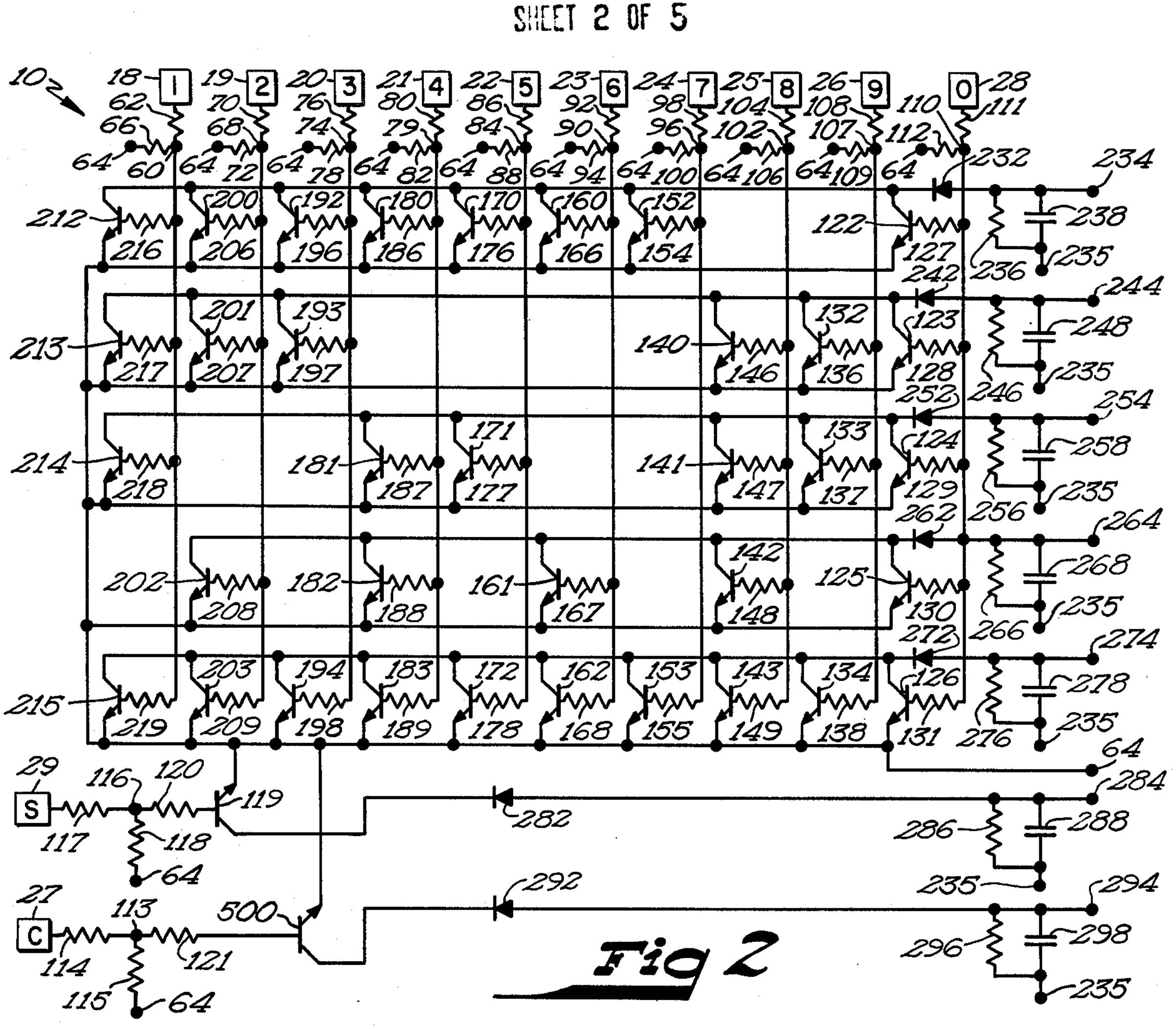
FIG. 2 shows a diagrammatic/schematic representation of a solid state, electronic, data entry, active encoding keyboard according to the present invention.

FIG. 2 shows a diagrammatic/schematic representation of keyboard 10 of the present invention, where touch surfaces 18 to 29 are represented by squares of the same number.

Surface 18, bearing the designation 1, is shown as interconnected to a junction point 60 through a resistor 62. Junction point 60 is also shown as connected to a further junction point 64 through a resistor 66.

Similarly, surface 19, designated 2, is interconnected to a junction point 68 through a resistor 70 and to junction point 64 through a resistor 72, and surface 20, designated 3, is interconnected with a junction point 74 through a resistor 76 and with junction point 64 through a resistor 78, and surface 21, designated 4, is interconnected with a junction point 79 through a resistor 80 and with junction point 64 through a resistor 82, and surface 22, designated 5, is interconnected with a junction point 84 through a resistor 86 and with junction point 64 through a resistor 88, and surface 23, designated 6, is interconnected with a junction point 90 through a resistor 92 and with junction point 64 through a resistor 94, and surface 24, designated 7, is interconnected with a junction point 96 through a resistor 98 and with junction point 64 through a resistor 100, and surface 25, designated 8, is interconnected with a junction point 102 by a resistor 104 and with junction point 64 through a resistor 106, and surface 26, designated 9, is connected to a junction point 107 through a resistor 108 and with junction point 64 through a resistor 109, and surface 28, designated 0, is connected with a junction point 110 through a resistor 111 and with junction point 64 through a resistor 112, and surface 27, designated C, is connected with a junction point 113 through a resistor 114 and with junction point 64 by a resitor 115, and surface 29, designated S, is connected to a junction point 116 through a resistor 117 and with junction point 64 through a resistor 118.

Junction point 116 of surface 29 is then connected to the base of an NPN transistor 119 through a resistor 120. Similarly, junction point 113 is connected to the base of an NPN transistor 500 through a resistor 121.

Junction point 110 associated with surface 28 is connected with the bases of five NPN transistors 122–126, inclusively, through five base resistors 127–131, respectively, with each base resistor extending from junction point 110 to its associated transistor base.

Similarly, junction point 107 is interconnected with the bases of three NPN transistors 132 to 134 through three base resistors 136 to 138, and junction point 102 is interconnected with the bases of four NPN transistors 140 to 143 through four base resistors 146 to 149, and junction point 96 is interconnected with two NPN transistors 152 and 153 through two base resistors 154 and 155, and junction point 90 is interconnected with three NPN transistors 160 to 162 through three base resistors 166 to 168, and junction point 84 is interconnected with three NPN transistors 170 to 172 through three base resistors 176 to 178, and junction point 79 is interconnected with four NPN transistors 180 to 183 through four base resistors 186 to 189, and junction point 74 is interconnected with three NPN transistors 192 to 194 through three base resistors 196 to 198, and junction point 68 is interconnected with four NPN transistors 200 to 203 through four base resistors 206 to 209, and junction point 60 is interconnected with four NPN transistors 212 to 215 through four base resistors 216 to 219.

All transistors above mentioned have their emitters commonly connected to junction point designated 64.

The collectors of transistors 122, 152, 160, 170, 180, 192, 200, and 212 are connected together and through diode 232 to a junction point 234. Junction point 234 is connected to a junction point 235 through the parallel interconnection of a resistor 236 and a capacitor 238.

Similarly, transistors 123, 132, 140, 193, 201, and 213 have their collectors connected via diode 242 to a junction point 244 which is interconnected with junction point 235 through resistor 246 and capacitor 248, and transistors 124, 133, 141, 171, 181, and 214 have their commonly connected collectors connected through diode 252 to a junction point 254 which is connected with junction point 235 through resistor 256 and capacitor 258, and the commonly connected collectors of transistors 125, 142, 161, 182, and 202 are connected through diode 262 to junction point 264 which is connected to junction point 235 through a resistor 266 and a capacitor 268, and the common collectors of transistors 126, 134, 143, 153, 162, 172, 183, 194, 203, and 215 are connected via diode 272 to junction point 274 which is connected to junction point 235 through resistor 276 and capacitor 278.

The collector of transistor 119 is connected through a diode 282 to a junction point 284 which is connected to junction point 235 through the parallel connection of resistor 286 and capacitor 288. Similarly, transistor 500 is connected via diode 292 to a junction point 294 and to junction point 235 through resistor 296 and capacitor 298.

Junction points 234, 244, 254, and 264 form the logic output terminals of the keyboard 10 of the present invention. The specific arrangement above set forth logically encodes each of the numerals 1–0 into a binary representation. That is, the key designated 0 is represented by the binary signal 0000; the key designated 9 is represented by the binary signal 1001; the key designated 8 is represented by the binary signal 1000; the key designated 7 is represented by the binary signal 0111; the key designated 6 is represented by the binary signal 0110; the key designated 5 is represented by the binary signal 0101; the key designated 4 is represented by the binary signal 0100; the key designated 3 is represented by the binary signal 0011; the key designated 2 is represented by the binary signal 0010; and the key designated 1 is represented by the binary signal 0001.

The above representation assumes that the terminal designated 264 is the two to the zero power terminal, the terminal designated 254 is the two to the first power terminal, the terminal designated 244 is the two to the second power terminal, and the terminal designated 234 is the two to the third power terminal and the order of reading is from 234 to 264. The above designation further assumes that a voltage at the particular terminal differing from the voltage at terminal 235 designates a logical 0.

It is to be noted that an actuation of any of the numeric keys also provides a logic 0 output at junction point 274. Junction point 274 is a strobe output indicating the actuation of any numeric key.

It is to be further noted that actuation by the user of either of the keys designated S or C provides a logic 0 output at their respective junction points, thus indicating actuation of the respective key.

Figure 3:
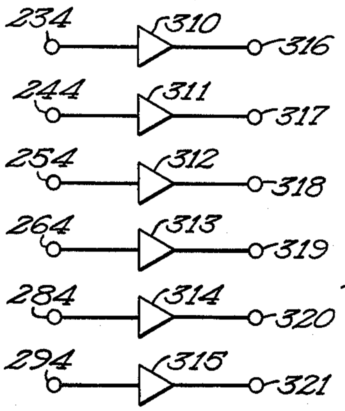
FIGS. 3, 4, and 5 show schematic representations of additional amplifiers which may be used with the schematic representations of the keyboard of FIG. 2.

FIG. 3 shows additional amplifiers which may be combined with the circuitry of FIG. 2 if, as in the preferred embodiment, additional gain or electrical isolation is necessary. That is, if the circuitry to follow the circuitry of FIG. 2, as for example input circuitry 56, has sufficiently high gain and sufficiently high input impedance, the second amplifiers shown in FIGS. 3, 4, and 5 may not be necessary.

In particular, FIG. 3 shows six additional amplifiers 310 to 315, inclusively, with input terminals 234, 244, 254, 264, 284, and 294, respectively, showing the interrelationship with junction points of the same number in FIG. 2. Output terminals for amplifiers 310 to 315 are numbered 316 to 321, respectively.

Figure 4:
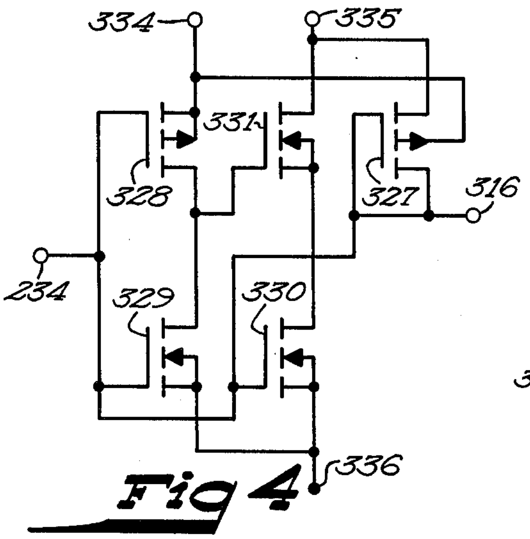

FIG. 4 shows a detailed schematic of an amplifier 310, for example, which is used in the preferred embodiment. It will be realized that the remaining additional amplifiers are of the same design, in the preferred embodiment, but no restriction is intended to this design. The amplifier shown in FIG. 4 is of the type CD4009A which is a Hex buffer/ converter of the inverting type and includes P-channel MOS field effect transistors 327 and 328 and N-channel MOS field effect transistors 329, 330, and 331 interconnected as shown between input 234 and output 316. Also included are two voltage supply terminals, 334 and 335, and a common terminal 336.

Figure 5:
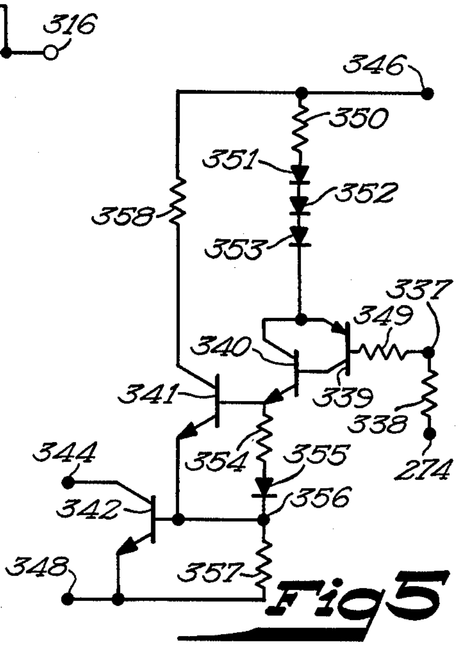

FIG. 5 shows another embodiment of additional amplifier which may be used with the circuitry of FIG. 2, among many others. The embodiment of FIG. 5 is used, in the preferred embodiment fabricated thus far, as a strobe amplifier and thus includes an input 337 which connects to junction point 274 through a resistor 338. The amplifier of FIG. 5 includes PNP transistor 339 and NPN transistors 340, 341, and 342 interconnected as shown between input 337 and a signal output 344. Also, voltage supply terminal 346 and common terminal 348 are shown.

FIG. 6 shows the interconnection of the circuitry of FIGS. 2, 3, 4, and 5 into a microelectronic circuit on face 16 of substrate 12. Parts are indicated by the numbers shown on the schematic of FIGS. 2, 3, 4, and 5 with the exception of the integrated circuits designated 360 and 362.

Integrated circuit 360 incorporates all of the structure of FIGS. 2 and 5 with the exception of the touch surfaces 18–29, resistors 62, 66, 70, 72, 76, 78, 80, 82, 86, 88, 92, 94, 98, 100, 104, 106, 108, 109, 111, 112, 114, 115, 117, 118, 236, 246, 256, 266, 276, 286, 296, and 338 and capacitors 238, 248, 258, 268, 278, 288, and 298.

Integrated circuit 362 incorporates the structure shown in FIGS. 3 and 4.

Figure 7:
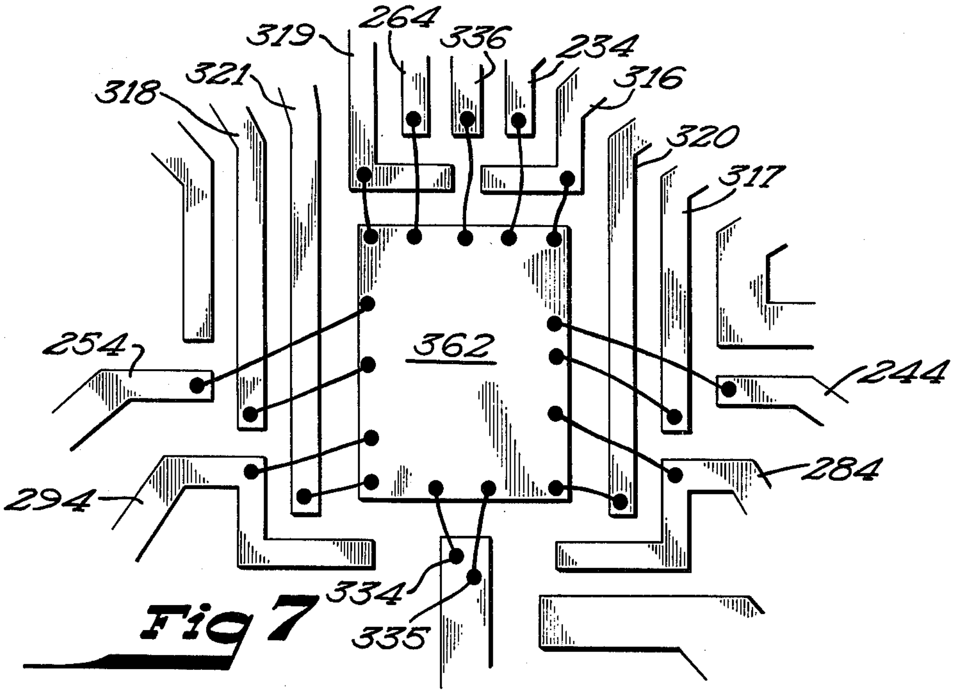
FIGS. 7 and 8 show enlargements of portions of the hybrid arrangement of FIG. 6.
Figure 8:
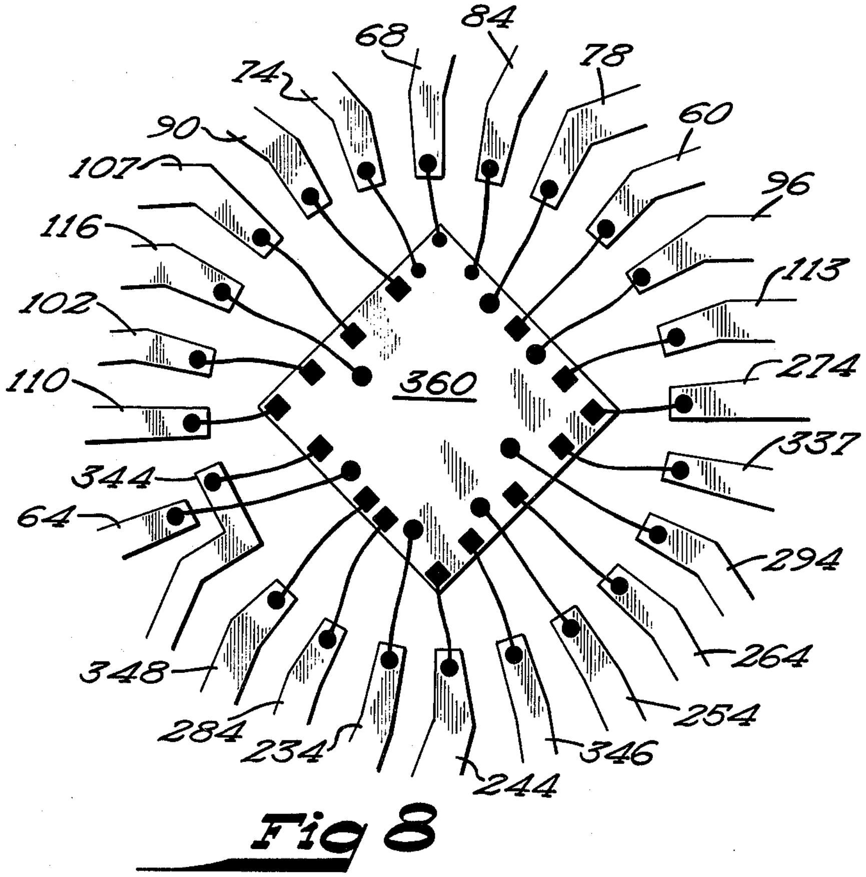

Connections to the integrated circuits 360 and 362 are more clearly shown in FIGS. 7 and 8 which are enlarged from FIG. 6.

FIG. 6 further includes junction points 370 to 382 corresponding to the interconnections between face 14 of ceramic 12 and face 16 of ceramic 12 between touch surfaces 1, 2, 3, 4, 5, 6, 7, 8, 9, C, 0, S, and antenna 32, respectively, as indicated by the designation aids with the junction points 370 to 382.

Also in FIG. 6 are a series of connection points, generally designated 383, which connect to the signal output connection 37 of FIG. 1. Connection points 383 include individual connection points 385 to 396, inclusively.

Further shown in FIG. 6 are jumper wires 398 and 406 for purposes explained hereinafter. Jumper wire 398, shown in dotted line to indicate optionality, which provides an electrical connection between junction points 348 and 64 shown in FIGS. 2, 5, and 8. Jumper wire 406, also shown in dotted line to indicate its optionality, provides an electrical connection between the top plate of capacitor 278, normally connected to junction point 274, and connection 396 of connection points 383. Connection point 396 is normally connected to output 344 of the amplifier shown in FIG. 5, but when jumper wire 406 is desired, connection point 396 is electrically disconnected from output 344 as by a break in the conductive trace shown in FIG. 6 at a point designated by the X indicated as 404. This alternate connection is made for purposes explained hereinafter. Also for purposes explained hereinafter, when jumper wire 398 is desired, an additional conductive trace is broken, as at the point designated by the X indicated as 400. Still further, for additional purposes hereinafter explained, another conductive trace connecting junction point 382 to the remainder of the electronic circuitry may be broken as at a point designated by the X indicated as 402.

The interconnections between the generally designated connection point 383 and the remaining numeration of the figures may now be explained. Connection point 385 is seen as connected with junction point 64; connection point 386 is connected with junction points 334, 335, and 346 and, in the preferred embodiment, accepts a source of D.D. potential positive with respect to earth ground; junction point 387 is not connected, in the preferred embodiment, but is used as an inhibit line; connection point 388 is connected to junction point 318 and forms the two to the first power output; connection point 389 is connected to junction point 321 and forms the output for the G key 27; connection point 390 is connected to junction point 319 and forms the two to the zero power output; connection point 391 is connected to junction point 336 and, in the preferred embodiment, is connected to a source of D.C. potential negative with respect to earth ground and functions as the common terminal for the circuitry; connection point 392 is connected to junction point 316 and provides the two to the third power output; connection point 393 is connected to junction point 320 and provides an output from the key designated S, number 29; connection point 394 is connected to junction point 317 and provides an output for the two to the second power signal; connection point 395 receives a disable supply voltage signal; and connection point 396 is connected to outut 344 of FIG. 5 and provides a strobe output.

Still further, the connection points 383 may now be seen to relate to the output connections 37 of FIG. 1, and in particular, output connections 38, 39, 40, 41, 42, 43, 44, and 45 may be seen as connected to output connections 388, 389, 390, 391, 392, 393, 394, and 396 with the remainder of the output connections 383 being represented by the dotted lines between the output connections in FIG. 1.

It may now also be seen that the junction points 370 to 382 interconnection with touch surfaces 18 to 29 by directly passing through the thickness of substrate 12, as by a direct wired connection, a plated through hole, or other means.

The precise fabrication technique for the microelectronic circuitry of FIG. 6 of the present invention is similar to that discussed and disclosed in detail in the application for Letters Patent, Ser. No. 280,258, indicated above, and thus will not be further discussed herein other than to indicate that a glass layer, similar to that discussed in application Ser. No. 280,258, should be placed below the interconnections shown in FIGS. 7 and 8 where they pass over a further conductor to avoid a drooping lead shorting to an undesired electrical conductor. Similar areas of glass are indicated in FIG. 6, as at 397, as used to electrically insulate conductor crossovers in that figure. It will of course be recognized by those skilled in the art that a sequencing of application of various conductive traces is necessary to allow interposition of the glass layer.

The keyboard of the present invention may then be caused to operate in a floating mode similar to that described in application Ser. No. 235,671 filed Mar. 17, 1972 in the name of Willis A. Larson. In this mode, the circuitry is as set forth in the figures without the necessity of jumper wires 398 and 406 and without the necessity of any breaks in the conductive traces, such as at 400, 402, and 404. It is preferred that an external electrical connection be made between output connection 385 and output connection 391 in this mode of operation to thereby connect the grid 32 on face 14 of substrate 12, shown in FIG. 1, to the ground potential used in the preferred embodiment.

By so connecting the antenna 32, and by causing the entire circuit to oscillate in the manner described in application Ser. No. 325,671, there is no leakage of electrical energy between individual of the touch surfaces 18 to 29 which would cause an undesired actuation of any of them. That is, antenna 32 is connected to the common point of the circuit, and any leakage is necessarily conducted to the common point rather than to any adjacent touch surface.

Also, while antenna 32 is shown as indicated completely around all the touch surfaces, this is not necessary if long leakage paths can be maintained, such as at the corner. Therefore, the outermost four corners of the antenna 32, as in the upper left corner of touch surface 18, the upper right corner of touch surface 20, the lower left corner of touch surface 27, and the lower right corner of touch surface 29, may be eliminated, since a view of FIG. 6 indicates that little if any circuitry is in the immediate area and a long leakage path around the edge of the substrate is provided between the indicated touch surfaces and any electrical conductor.

The keyboard of the present invention may also be connected in a grounded fashion similar to that described in application Ser. No. 284, 043 filed Aug. 28, 1972 in the name of the present inventors. In this mode of operation, jumper wires 398 and 406 are used, and the conductive traces of FIG. 6 are broken at 400 and 404 to allow the interconnection as discussed above. The reasoning behind the modifications is that the amplifier of FIG. 5 was included as a part of integrated circuit 362 which has a substrate connected to junction point 64. Therefore, since, in this mode of operation, junction point 64 must oscillate about junction point 348, inappropriate forward biased junction operation of the amplifier of FIG. 5 would necessarily result. Thus, an external amplifier is used for the strobe line, necessitating the interconnectional breaks and the use of jumper wires. It will be immediately recognized that other techniques may be used to obviate this minor difficulty.

The keyboard of the present invention may also be used in battery operation with interconnections as indicated for the basic floating mode operation with the exception that the conductive trace brake indicated at 402 is made. Break 402 is made to remove antenna 32 from a direct interconnection with output connection 391, which has been indicated the common point for the circuit. With antenna 32 thus removed, the circuitry of FIG. 9 may be employed.

Figure 9:
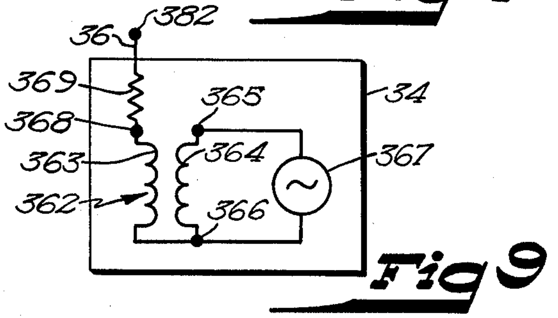
FIG. 9 shows a schematic arrangement of an oscillator for battery operation depicted in block form in FIG. 1.

In FIG. 9, a transformer 362 is shown having a secondary 363 and a primary 364 including primary terminals 365 and 366. An oscillator 367 is then connected across primary terminals 365 and 366. Secondary 363 is connected between terminal 366 and a secondary terminal 368, and through a large resistance 369 to connection point 382, as in FIG. 6, via connection 36 shown in FIGS. 1 and 9.

From the foregoing, it is believed that one skilled in the art can adequately select circuit parameters to insure proper performance. One such set of values found to perform well is as follows:

Resistors 62, 66, 68, 70, 72, 76, 78, 80, 82, 86, 88, 92, 94, 98, 100, 104, 106, 108, 109, 111, 112, 114, 115, 117, and 118 have a value of approximately 2 megohms each;

Resistors 127 to 131, 136 to 138, 146 to 149, 154 and 155, 166 to 168, 176 to 178, 186 to 189, 196 to 198, 206 to 209, 216 to 219, 349, 350, 354, and 357 have a value of approximately 10 kilohms each;

Resistors 236, 246, 256, 266, 276, 286, and 296 have a value of approximately 35 megohms each;

Resistor 338 has a value of approximately 10 megohms;

Capacitors 238, 248, 258, 268, 278, 288, and 298 have a value of approximately 2,000 picofarads each;

Transistor 339 has a value of beta greater than one at a base current of 500 nanoamperes;

Transistors 119, 500, 122 to 126, 132 to 138, 140 to 143, 152 and 153, 160 to 162, 170 to 172, 180 to 183, 192 to 194, 200 to 203, and 340 to 342 have a value of beta generally greater than 50 at 50 nanoamperes base current and also have a collector leakage current of less than 10 nanoamperes at a voltage, collector to emitter, of 30 volts;

Diodes 232, 242, 252, 262, 272, 282, and 292 have a peak inverse voltage of greater than 30 volts and an inverse current of less than 20 nanoamperes at an inverse voltage of 30 volts;

These values assume that:

diodes 351, 352, 353, and 355 are used for their forward voltage drop characteristics only;

All supply voltages are a nominal 5 volts with a range of from 4 to 30 volts designed for;

Input currents from the touch of an operator are in the range of 50 nanoamperes;

Output current from amplifier output terminals 316 to 321 are in the range of low milliamperes each; and Transistor 342 is designed for a base current of approximately 5 milliamperes and a collector current of approximately 30 milliamperes.

OPERATION

Basically, the keyboard 10 of the present invention operates by passively accepting an input signal generated by the user by selecting individual surfaces, such as surfaces 18 to 29, actively encoding the signal generated, as in a switching encoder, integrating the encoded signal, and amplifying the integrated signal if necessary. This basic operation is illustrated in FIG. 10.

Figure 10:
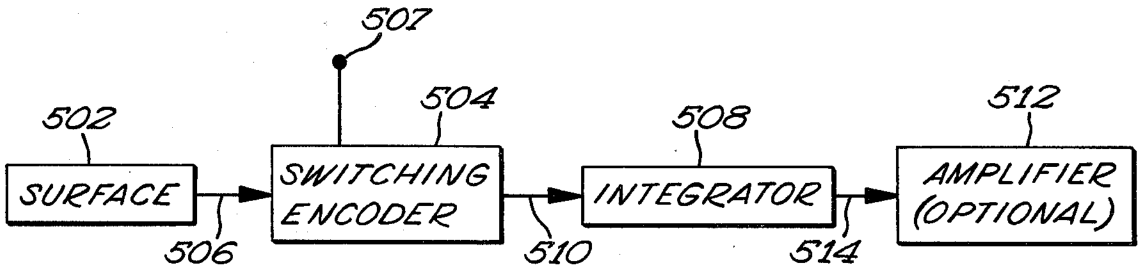
FIG. 10 shows a block diagram of a solid state, electronic, data entry, active encoding keyboard according to the present invention which is useful in explaining the operation.

In FIG. 10, a functional block 502 is shown representing surfaces which may be selected by the user in order to cause generation of a signal, such as surfaces 18 to 29. Surface block 502 is shown as providing an electrical signal to a switching encoder 504 via connection 506. Switching encoder 504 generally represents circuits of the type shown and described in FIG. 2 and the similar types of FIG. 11, as explained below. Thus, switching encoder 504 includes an input 507 arranged to receive oscillation in the manner that oscillation is received with respect to the keyboard of the present invention in its various modes of operation, as explained above and as further explained below. Signals from switching encoder block 504 are then provided to an integrator block 508 representing the broad class of apparatus for integrating electrical signals, such as the capacitors shown in FIG. 2, and may include many others. Lastly, the signal from the operator block 508 is provided to an amplifier block 512 via connection 514. Amplifier block 512, which is indicated as optional, is representative of amplifiers such as described above with respect to FIGS. 3, 4, and 5, and others.

The block diagram of FIG. 10 is then illustrative of at least a portion of the novel features of the present invention. In particular, all known keyboards, including those using conventional mechanical switching and other touch operable switches, perform current switching at the location of surfaces 502 in FIG. 10. It is to be noted that the present invention includes passive surfaces of no moving parts and providing no current switching at this point. The current switching of the present invention is combined with the encoding in switching encoder 504 therefore allowing an improved, more efficient keyboard, in addition to the advantages already indicated above.

Thus the surfaces 18 to 29, represented by block 502, are merely passive in nature, as in the sense of being merely acted upon by the finger or other part of the body of an operator, rather than active as is the switching encoder, block 504, in the sense of altering or acting upon the signal.

Further, all known keyboards provide a common bus or connection to all keys and switch the connections to or from this common bus by means of the keys. In the present invention this common bus function is performed by the operator in his (her) common access to earth ground. Thus the individual keys of the keyboard of the present invention are separate and require no connection to a common bus and, again, the keyboard may have fewer parts in addition to its other advantages.

Figure 11:
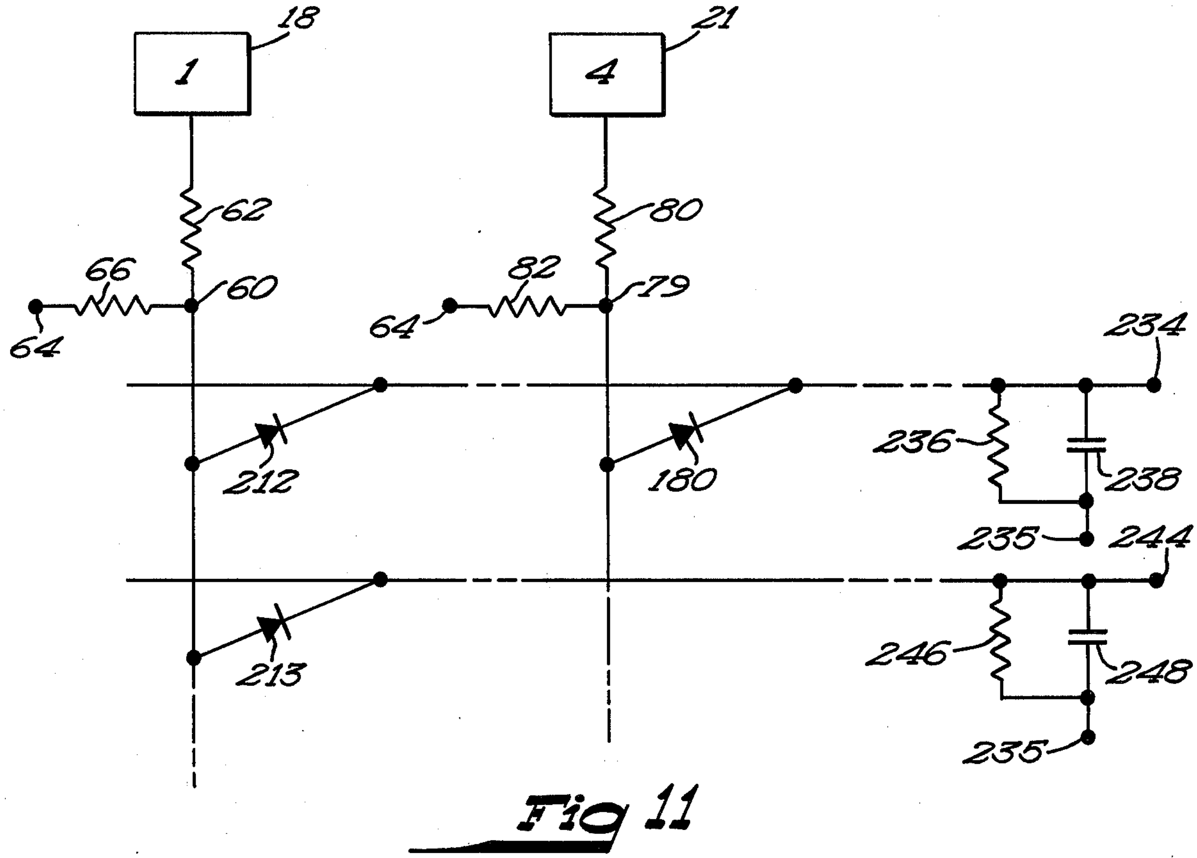
FIG. 11 shows a partial schematic of a keyboard similar to that of FIG. 2.

Also, the transistors shown in FIG. 2 may be considered as unidirectional members such as diodes of the same number shown in the partial schematic diagram of FIG. 11. FIG. 11 then represents a schematic of the same type as FIG. 2, in partial form to illustrate changes, to indicate that the base collector junction of the transistors of FIG. 2 may be considered as diodes and operate as explained herein in the floating and batter modes of operation, assuming a negative polarity of voltage at junction point 235 of FIG. 11 for the diode orientation shown. Transistors or their equivalent are preferred, however, because they allow operation in all modes explained at least due to the further possibilities of the application of oscillation.

In particular, assuming the electrical connections of FIG. 6 are as set forth above for the floating mode of operation, substantially as set forth in describing FIG. 6, as shown, without jumper wires or conductor breaks, but with an external connection between connection point 391 and connection point 385 thus connecting junction points 64, as shown in schematic form in FIG. 2, with the antenna 32, specifically shown in FIG. 1, together with the source of D. C. potential negative with respect to earth ground, the operation of this floating mode is as follows: the supply voltages as applied to junction points 64 and 235 through connection points 386 and 391 are caused to oscillate with respect to earth ground at the frequency of the alternating voltage power input, for example, as explained in detail in application Ser. No. 235,671 referred to above or at a higher rate. By the interconnection of electronic circuitry discussed above, each surface 18 to 29 also oscillates with respect to earth ground at the frequency of oscillation provided to connection points 386 and 391. The operator's touch then provides a capacitive connection between earth ground and a particular surface selected and appears to the circuitry of FIG. 2, which is isolated from earth ground, as an alternating frequency input of an amplitude equal to the amplitude at which the circuitry of FIG. 2 is oscillating with respect to earth ground due to the oscillation provided through connection points 386 and 391. That is, the capacitive interconnection between the surface and earth ground provided by the touch of an operator in selecting a particular surface causes an alternating current to flow between a particular selected touch surface and earth ground through the capacitance of a human operator. This alternating current applied to a particular touch surface, for example, surface 18, provides base current to transistors 212, 213, 214, and 215 to thus cause a change in state in these transistors. That is, transistors 212 to 215 are caused to change from a nonconducting state to a conducting state and unidirectionally provide an electrical signal to integrators 238, 248, 258, and 278, respectively. The integrated signal from integrators 238, 248, 258, and 278 then causes the associated junction points 234, 244, 254, and 274 to provide a voltage differing from the voltage at terminal 235, which is ultimately connected to junction points 334 and 346 and to a source of D.C. potential positive with respect to earth ground through connection point 386. Thus, the binary signal 0001 is generated at output terminals 234, 244, 254, and 264 and a binary 0 is generated at strobe output 274 to indicate that a particular surface has been selected.

That is, a selection of surface 18 by the user and a touch of this surface causes the generation of a signal, as explained above, which signal is encoded in the switching encoder represented by the schematic circuitry of FIG. 2, and a binary representation of the surface selected is provided at keyboard output junction points 234, 244, 254, and 264.

An output at junction point 274 is also generated to indicate that one of the surfaces has been selected. It is to be noted that an output is provided at junction point 274 upon selection of any surface, thus providing the remaining circuitry with a signal indicating an actuation has been generated by selection of a user, and allowing signal transmissions which are in phase with this selection to minimize the potential for noise signals to cause a display change, as in visual display 63 shown in FIG. 1.

Also, additional keys, such as keys 27 and 29, are provided for such functions as "set" and "clear", which require an output whenever selected by the user, as provided by the electronic circuitry shown in schematic form in FIG. 2.

Similarly, assuming the electrical connections of FIG. 6 are as set forth for the grounded mode of operation, with the circuitry of FIG. 6 changed to include junction wires 398 and 406 and conductive trace breaks at 400 and 404, as discussed above, the operation of this grounded mode is as follows: an oscillatory signal, for example related to an alternating frequency power input as set forth in application Ser. No. 284,043 referred to above, or at a higher rate, is applied to connection point 385 to thus appear at junction point 64 as shown in FIG. 2 and cause the emitter-base junctions of the transistors of FIG. 2 to oscillate with respect to earth ground. By the interconnection of electronic circuitry, each surface 18 to 29 then also oscillates with respect to earth ground at the frequency of oscillation provided to connection point 385. The operator's touch then provides a capacitive connection between earth ground and a particular surface selected and appears to the circuitry of FIG. 2, the input of which is isolated from and oscillating with respect to earth ground, as a reference between that input and earth ground which appears to the transistors associated with the particular touch surfaces as an alternating frequency input of an amplitude substantially equal to the amplitude at which the touch surfaces are oscillating with respect to earth ground. This reference generates an alternating current which is switched and encoded, as explained generally with respect to the floating mode of operation, and caused to appear at the keyboard output junction points 234, 244, 254, 264, and 274.

Further, assuming the electrical connections are as set forth for the battery mode of operation of the keyboard 10 of the present invention, which are generally as set forth above with respect to the floating mode with the exception that the conductive trace shown in FIG. 6 is broken at 402 and the circuitry of FIG. 9 is connected to connection point 382 as shown in that FIG., the operation in this battery mode is as follows: oscillator 367 of FIG. 9, which may be any conventional oscillator such as a unijunction oscillator, provides an oscillation, for example, of 10 volts in amplitude to transformer 362. Transformer 362, in an embodiment found satisfactory, is a 150 to 1 voltage step-up transformer thus providing a secondary voltage across terminals 366–368 of secondary 363 of transformer 362 of an alternating nature, of an amplitude of approximately 1,500 volts, and of very low power. Oscillations from secondary 363 are then provided to antenna 32, as shown in FIG. 1, through resistor 369, as shown in FIG. 9. Antenna 32 is arranged operatively adjacent surfaces 18–29 and, with the interposition of the user, sufficient energy is coupled from antenna 32, to the user, and to particular of the surfaces 18–29 as selected by the user to provide an actuation of the keyboard.

In this battery mode of operation, no oscillation is provided to junction point 64 or 235, as seen in the schematic of FIG. 2, and these junction points are merely connected to a battery, for example, providing a source of power. Oscillation is provided to the keyboard through particular of the surfaces 18 to 29, functioning as keys, switched and encoded as explained generally with respect to the floating mode of operation, and caused to appear at the keyboard output junction points 234, 244, 254, 264, and 274.

Surfaces 18 to 29, in the preferred embodiment, are squares of material, approximately one-half inch on a side. This dimension is arranged, among other reasons, to provide insufficient coupling with antenna 32, which measures in the area of 12 inches in length as shown in FIG. 1, to provide an actuation of keyboard 10 of the present invention. The interposition of the human user capacitively interacting with particular surfaces to be selected then effectively increases the coupling such that sufficient energy is coupled from the antenna to the keyboard to provide an actuation.

This actuation may thus be caused by enlarging the transmission antenna, for example antenna 32, or by enlarging the reception antenna, for example any one or more of the surfaces 18 to 29.

Enlarging the reception antenna of the surfaces is the technique generally used where the resistive or capacitive interaction between the human and a particular surface selected, as by touch, effectively greatly enlarges the receiving antenna in the form of adding the surface area of the human to the effective receptive antenna of a particular surface and thus causes a greatly enhanced coupling of energy between the transmission antenna, for example antenna 32, and the particular surface selected.

In this mode where the receptive antenna is enlarged, the transmissive antenna, shown as 32 in FIG. 1, may take other embodiments, for example a metal layer adjacent the surfaces 18 to 29, other than the form shown, the particular metal chassis supporting the keyboard of the present invention, a deposition or metal loop on the back surface 16 of the keyboard shown in FIG. 6, and many other configurations which will now be apparent to those skilled in the art. The particular configuration shown in FIG. 1 is deemed preferred since, in other modes of operation, it provides the isolation explained above. Any antenna arrangement which is operatively adjacent at least selected of the surfaces may be used, however.

Where the transmissive antenna is desired to be enlarged, this may be accomplished by connecting the transmissive antenna 32 to the chassis which is intended to be handheld by the operator. In this mode the operator himself comprises a part of the transmissive antenna and an approach to a particular surface to be selected, either resistively or capacitively, can cause actuation of the keyboard of the present invention.

That is, the keyboard of the present invention may include a glass layer or other insulative material over all of the keys, and the coupling be made capacitively, or the coupling may be made resistively by actual contact with any one or more of the surfaces 18 to 29.

Also, the keyboard of the present invention may be operated resistively, as in the battery mode where, for example, the negative terminal of the battery may be connected to the metal chassis supporting the keyboard and resistive coupling between the handheld chassis and the surfaces 18 to 29 is provided by the skin resistance of the operator.

Now that the basic teachings of the present invention have been explained, many extensions and variations will be obvious to one having ordinary skill in the art. For example, many values of components other than those given will be found to function adequately with modification of various of the parameters including the voltages supplied, the outputs required, the gains of various of the amplifiers, and other parameters well-known to those skilled in the art. Similarly, amplifier configurations other than those indicated will function adequately so long as the gains are such as to provide appropriate isolation and power output.

Also, configurations of the keyboard of the present invention other than the one configuration shown in FIG. 1 may be used. The configuration shown in FIG. 1 is to illustrate the utility of the keyboard of the present invention as applied to a standard ten key arrangement, and more, fewer, different configurations, and different representations will be envisioned with the teachings of the present invention.

Additionally, while the preferred embodiment of the present invention has been disclosed with punched through connections between face 14 and face 16 of substrate 12, which is deemed preferred for space conservation considerations, no limitation to this technique is required.

Further, more, less, or other circuitry may be provided in integrated or other form.

Furthermore, while particular points at which to insert the oscillation accepted by input 507 have been discussed, others are envisioned. Also, the oscillatory techniques of the present invention may be subtractive, instead of additive as thus far set forth, as where oscillation is inserted into a twin T capacitor, such as that disclosed in FIGS. 1 and 2 of U.S. Pat. No. 3,492,440 issued to R. L. Cerbone, et al., and elsewhere, and the touch of the operator is caused to diminish the oscillation provided to the switching decoder 504.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A solid state, electronic, data entry, active encoding keyboard for accepting an input signal from the touch of a user and providing an output signal for use with electronic circuits, comprising in combination: an insulator having opposed major faces; a plurality of electrically isolated, individual surfaces immovably fixed to one of the major faces of the insulator in a patterned arrangement accessible to the user to allow a desired input signal to be generated by a user by selecting individual touch surfaces; keyboard output means arranged on a face of the insulator to provide an output signal for use by the electronic circuits; a plurality of electrically isolated encoding amplifiers fixed to one of the major faces of the insulator with each amplifier including input means for receiving electronic signals from at least one touch surface and including output means for providing an electronic signal related to the electronic signal applied to the input means; input means for providing an electrical coupling between the individual touch surfaces on a face of the insulator and the input means of selected of the encoding amplifiers for encoding signals from the touch surfaces; and logic signal output connection means for providing an electrical connection between output means of selected of the encoding amplifiers and the keyboard output means for providing signals from the touch surfaces encoded into logic signals available at the keyboard output means; a plurality of storage means fixed to a face of the insulator with a storage means operatively associated with each logic signal output connection means.

2. The solid state, electronic, data entry, active encoding keyboard of claim 1 wherein the encoding amplifiers include means common to both input means and output means; also including means for accepting an oscillatory electronic signal; and including means for providing an electrical connection between the means for accepting an oscillatory signal and the common means of the encoding amplifiers.

3. The solid state, electronic, data entry, active encoding keyboard of claim 2 including at least ten individual touch surfaces to uniquely represent each of the decimal numbers from zero to nine, wherein the keyboard output means provides at least four distinct output logic signals to allow encoding of any decimal number from zero to nine into a binary representation.

4. The solid state, electronic, data entry, active encoding keyboard of claim 2 further including a plurality of additional amplifiers with each amplifier including input means for receiving electrical signals and including output means for providing an electronic signal related to the electronic signal applied to the input means; and means for providing an electrical connection between the additional amplifiers and the storage means in a manner to uniquely interconnect one additional amplifier with one storage means.

5. The solid state, electronic, data entry, active encoding keyboard of claim 4, wherein the encoding amplifiers and storage means are fixed to the other of the major faces of the insulator.

6. The solid state, electronic, data entry, active encoding keyboard of claim 5, wherein the additional amplifiers are also fixed to the other opposed major face of the insulator.

7. The solid state, electronic, data entry, active encoding keyboard of claim 6, including an antenna arranged around and about at least selected of the touch surfaces; second means for accepting an oscillatory electronic signal; means for providing an electrical connection between the antenna and the second means for accepting an oscillatory signal for providing sufficient energy transfer from the second means for accepting an oscillatory signal to at least one touch surface through the electronic coupling between the antenna, the user, and the touch surface to provide an actuating signal to the keyboard and cause an electronic signal to appear at the logic signal output connection means.

8. The keyboard of claim 7, wherein the antenna is in a patterned arrangement surrounding each of the touch surfaces to better assure coupling between the antenna and the user and better assure reliable actuation of the keyboard.

9. The solid state, electronic, data entry, active encoding keyboard of claim 1 including at least ten individual touch surfaces to uniquely represent each of the decimal numbers from zero to nine, wherein the keyboard output means provides at least four distinct output logic signals to allow encoding of any decimal number from zero to nine into binary coded decimal.

10. The solid state, electronic, data entry, active encoding keyboard of claim 1 further including a plurality of additional amplifiers with each amplifier including input means for receiving electrical signals and including output means for providing an electronic signal related to the electronic signal applied to the input means; and means for providing an electrical connection between the additional amplifiers and the storage means in a manner to uniquely interconnect one additional amplifier with one storage means.

11. The solid state, electronic, data entry, active encoding keyboard of claim 10, wherein the encoding amplifiers and storage means are fixed to the other of the major faces of the insulator.

12. The solid state, electronic, data entry, active encoding keyboard of claim 11, wherein the additional amplifiers are also fixed to the other opposed major face of the insulator.

13. The solid state, electronic, data entry, active encoding keyboard of claim 1, wherein the encoding amplifiers and storage means are fixed to the other of the major faces of the insulator.

14. The solid state, electronic, data entry, active encoding keyboard of claim 13, wherein the encoding amplifiers are connected to the individual touch surfaces by direct connection through the insulator.

15. The solid state, electronic, data entry, active encoding keyboard of claim 14 further including a plurality of additional amplifiers with each amplifier including input means for receiving electrical signals and including output means for providing an electronic signal related to the electronic signal applied to the input means; and means for providing an electrical connection between the additional amplifiers and the storage means in a manner to uniquely interconnect one additional amplifier with one storage means.

16. The solid state, electronic, data entry, active encoding keyboard of claim 15, wherein the additional amplifiers are also fixed to the other opposed major face of the insulator.

17. The solid state, electronic, data entry, active encoding keyboard of claim 1, including an antenna arranged around and about at least selected of the touch surfaces; means for accepting an oscillatory electronic signal; means for providing an electrical connection between the antenna and the means for accepting an oscillatory signal for providing sufficient energy transfer from the means for accepting an oscillatory signal to at least one touch surface through the electronic coupling between the antenna, the user, and the touch surface to provide an actuating signal to the keyboard and cause an electronic signal to appear at the logic signal output connection means.

18. The keyboard of claim 17, wherein the antenna is in a patterned arrangement surrounding each of the touch surfaces to better assure coupling between the antenna and the user and better assure reliable actuation of the keyboard.

19. A solid state, electronic, data entry, active encoding keyboard for accepting an input signal from the touch of a user and providing an output signal for use with electronic circuits, comprising in combination: an insulator having opposed major faces; a plurality of electrically isolated, individual surfaces immovably fixed to one of the major faces of the insulator in a patterned arrangement accessible to the user to allow a desired input signal to be generated by a user by selecting individual surfaces; keyboard output means arranged on a face of the insulator to provide an output signal for use by the electronic circuits; switching encoder means including input means and output means; input means for providing an electrical coupling between the individual surfaces on a face of the insulator and the input means of the switching encoder means for encoding signals from the surfaces; and logic signal output connection means for providing an electrical connection between output means of the switching encoder means and the keyboard output means for providing signals from the surfaces encoded into logic signals available at the keyboard output means; integrating means with an integrating means associated with each logic signal output connection means.

20. The solid state, electronic, data entry, active encoding keyboard of claim 19, wherein the switching encoder means includes means for accepting an oscillatory signal.

21. A solid state, electronic, data entry, active encoding keyboard for accepting an input signal from the touch of a user and providing an output signal for use with electronic circuits, comprising in combination: an insulator having opposed major faces; a plurality of electrically isolated, individual surfaces immovably fixed to one of the major faces of the insulator in a patterned arrangement accessible to the user to allow a desired input signal to be generated by a user by selecting individual surfaces; keyboard output means to provide an output signal for use by the electronic circuits; switching encoder means including input means and output means and means for accepting an oscillatory signal; input means for providing an electrical coupling between the individual surfaces on a face of the insulator and the input means of the switching encoder means for encoding signals from the surfaces; and logic signal output connection means for providing an electrical connection between output means of the switching encoder means and the keyboard output means for providing signals from the surfaces encoded into logic signals available at the keyboard output means.

22. The solid state, electronic, data entry, active encoding keyboard of claim 21, including integrating means with an integrating means associated with each logic signal output connection means.

* * * * *